United States Patent [19]

Tang et al.

[11] Patent Number: 5,894,090
[45] Date of Patent: Apr. 13, 1999

[54] SILICON BULK MICROMACHINED, SYMMETRIC, DEGENERATE VIBRATORYGYROSCOPE, ACCELEROMETER AND SENSOR AND METHOD FOR USING THE SAME

[75] Inventors: Tony K. Tang, Glendale; William J. Kaiser, Los Angeles; Randall K. Bartman, Altadena; Jaroslava Z. Wilcox, Los Angeles; Roman C. Gutierrez, Glendale; Robert J. Calvet, Pasadena, all of Calif.

[73] Assignee: California Institute of Technology, Pasadena, Calif.

[21] Appl. No.: 08/657,685

[22] Filed: May 31, 1996

[51] Int. Cl.$^6$ .................. G01C 19/00; G01P 9/00; G01P 15/14

[52] U.S. Cl. .................. 73/504.02; 73/504.04; 73/504.12; 73/514.29; 73/514.32; 331/158

[58] Field of Search .................. 73/504.12, 504.04, 73/514.15, 514.29, 662, 514.35, 502.02, 514.16, 514.32; 324/76.49; 331/158; 437/921

[56] References Cited

U.S. PATENT DOCUMENTS

| | | |
|---|---|---|
| 5,001,940 | 3/1991 | Ogawa .................. 74/5.6 |
| 5,134,881 | 8/1992 | Henrion et al. .................. 73/514.35 |
| 5,203,208 | 4/1993 | Bernstein .................. 73/504.12 |
| 5,313,835 | 5/1994 | Dunn .................. 73/514.15 |
| 5,377,544 | 1/1995 | Dunn .................. 73/504.12 |
| 5,511,419 | 4/1996 | Dunn .................. 73/504.08 |

*Primary Examiner*—Hezron Williams
*Assistant Examiner*—Richard A. Moller
*Attorney, Agent, or Firm*—Daniel L. Dawes

[57] ABSTRACT

When embodied in a microgyroscope, the invention is comprised of a silicon, four-leaf clover structure with a post attached to the center. The whole structure is suspended by four silicon cantilevers or springs. The device is electrostatically actuated and capacitively detects Coriolis induced motions of the leaves of the leaf clover structure. In the case where the post is not symmetric with the plane of the clover leaves, the device can is usable as an accelerometer. If the post is provided in the shape of a dumb bell or an asymmetric post, the center of gravity is moved out of the plane of clover leaf structure and a hybrid device is provided. When the clover leaf structure is used without a center mass, it performs as a high Q resonator usable as a sensor of any physical phenomena which can be coupled to the resonant performance.

34 Claims, 6 Drawing Sheets

SILICON BULK MICROMACHINED, SYMMETRIC, DEGENERATE VIBRATORY GYROSCOPE, ACCELEROMETER AND SENSOR AND METHOD FOR USING THE SAME

The invention described herein was made in the performance of work under an NASA contract and is subject to provisions of Public Law 9-517 (35 USC 202) in which the contractor has elected to retain title.

BACKGROUND OF THE INVENTION

1. Field of the Invention

The invention relates to silicon bulk micromachined transducers and in particular vibratory symmetric transducers usable as gyroscopes, sensors and accelerometers.

2. Description of the Prior Art

The applications for gyroscopes in guidance and control devices is notorious and has been realized in more recent technologies by means of optical gyroscopes such as ring laser gyroscopes, and fiberoptic gyroscopes as well as vibratory gyroscopes such as hemispherical resonator gyroscopes, tuning fork gyroscopes, and silicon micromachined vibratory gyroscopes.

The advantages of optical gyroscopes include high dynamic range, high band width, rapid start up, little acceleration sensitivity at least to the first order, good day-to-day drift stability and a stable linear scale factor. The ring laser gyroscope and fiberoptic gyroscopes in particular have excellent stability over periods of hours, but are noisy during short term intervals of the duration of several seconds, where they act as white noise generators. High performance optical gyroscopes also require complex electronics support, a path link controller, a high voltage power supply, mechanical dithering, optical modulators, thermoelectric coolers, signal processing, high order modeling, precision optical components and complicated and delicate assembly and manufacturing processes. Each of these requirements increases the cost and power requirements of high performance optical gyroscopes. Moreover, the performance of an optical gyroscope depends directly with the area enclosed within its optical path. Apart from various technical difficulties encountered in attempting to reduce fiberoptic gyroscopes and ring laser gyroscopes to millimeter dimensions, this fundamental scaling law makes it effectively impossible to realize small, high performance optical gyroscopes.

In a vibratory gyroscope, the Coriolis effect induces energy transfer from the driver input vibratory mode to another mode which is sensed or output during rotation of the gyroscope. An example of such a high performance vibratory gyroscope is the hemispherical resonator gyroscope. The hemispherical resonator gyroscope is made of quartz and has a shell resonator design. It is immune to external vibration and is capable of standing high g shocks. However, it requires precise machining of the resonator and housing, high vacuum sealing and gettering, and computer support. The hemispherical resonator gyroscope is very large, difficult to manufacture, expensive and consumes a large amount of power.

Another type of vibratory gyroscope is the quartz tuning fork vibratory gyroscope. This type of gyroscope is insensitive to linear vibration, has low mechanical loss, and is capable of standing high g shock. However, the quartz tuning fork microscope has low responsitivity, high temperature sensitivity, and is not integratable with silicon electronics.

Silicon micromachined vibratory gyroscopes are integratable with silicon electronics. These devices are capable of achieving high Q factors, can withstand high g shocks due to their small masses, are insensitive to linear vibration and consume little power. However, most of these micromachined gyroscopes have a very small rotation response, since their input and output vibration modes have different mode shapes and resonant frequencies. The use of different resonant modes also makes these devices very temperature sensitive due to the different temperature dependency of each of the modes. These devices usually have very high resonant frequencies resulting in low responsitivity, since the Coriolis induced response is inversely proportional to the resonant frequency of the structure. Finally, due to the small mass of the structure, thermal noise limits the ultimate performance and use of microgyroscopes. For these reasons, micromachined vibratory gyroscopes have not been used for spacecraft navigation and attitude control applications, but have been employed primarily for automotive applications in which extreme low cost is a major driving factor and performance is set at a lower premium.

Therefore, what is needed is some type of silicon micromachined vibratory gyroscope, accelerometer or sensor which overcomes each of the shortcomings of the prior art. In particular, what is needed is a silicon micromachined vibratory microgyroscope that:

(1) has a much larger mass than other micromachined microgyroscopes therefore providing a much lower mechanical resonance and lower thermal noise limit;

(2) has a design which reduces fabrication complexity, is adaptable for batch production and avoids temperature sensitivity while providing a high rotational response;

(3) has an inherently high Q design;

(4) provides for simple and rugged detection and actuation;

(5) operates to provide increased sensitivity and to reject common mode signals such as environmental vibrations and bias offsets; and (6) can be fabricated using silicon bulk micromachined techniques to reduce cost of fabrication complexity, to provide high reproducibility in the mechanical characteristics while retaining low cost, overall low mass, and low power.

BRIEF SUMMARY OF THE INVENTION

The invention is a micromachined resonator comprising a micromachined symmetric leaf structure having a plurality of symmetrically disposed leaves about a defined center. At least one micromachined spring is symmetrically disposed with respect to the symmetric leaf structure and supports the symmetrical leaf structure. A rim/base structure is coupled to the spring. The rim/base structure includes a plurality of sensing and drive electrodes. A circuit is electrically coupled to the electrodes included within the rim/base structure. The circuit provides drive signals to the drive electrodes to oscillate the symmetric leaf structure and to receive a sensing signal from the sensing electrodes to detect response of the oscillating symmetric leaf structure to exterior physical phenomena. As a result, a rugged, small, low cost, high performance vibratory sensor is provided.

More particularly the resonator employs a plurality of the springs for coupling and supporting the symmetric leaf structure to the rim/base structure. The plurality of springs are symmetrically disposed with respect to the symmetric leaf structure. The symmetric leaf structure and plurality of springs are symmetric about at least two separate axes. The axis of symmetry of the symmetric leaf structure and the plurality of springs are orthogonal to each other.

The resonator further comprises a mass element rigidly connected to the symmetric leaf structure. In the preferred embodiment, the mass element is symmetrically disposed at the center of the symmetric leaf structure. The symmetric leaf structure is substantially defined in a plane and the mass element extends in a direction including a substantial perpendicular component to the plane of the symmetric leaf structure. In the preferred embodiment the mass element is a cylinder disposed through the center of mass of the symmetric leaf structure. Where the mass element is symmetrically disposed with respect to the symmetric leaf structure, the resonator is usable as the electromechanical portion of a microgyroscope. The mass element can also be asymmetrically disposed and still allow the resonator to operate as a microgyroscope, albeit sensitive to linear accelerations as well.

In the case where the mass element is disposed perpendicular to the plane of the symmetric leaf structure and substantially on one side thereof, it is usable as the electromechanical portion of an accelerometer. It is also within the scope of the invention that the mass element is disposed asymmetrically disposed on both sides of the plane in which case is usable as a combined microgyroscope and accelerometer.

In the illustrated embodiment the symmetric leaf structure is a clover leaf pattern comprised of four leaves symmetrically disposed about the center and wherein the clover leave pattern is disposed within a plane. The resonator further comprises four springs connected to the clover leaf pattern and symmetrically disposed between each of the four clover leaves to connect the center with the rim/base and to support the clover leaf pattern relative to the rim/base structure. The rim/base structure comprises a rim disposed in the plane of the clover leaf pattern and a base disposed beneath the rim and coupled thereto. The electrodes provided within the rim/base structure are provided on the base. Two electrodes are provided as the drive electrodes and two electrodes are provided as the sensing electrodes. The driving and sensing electrodes are positioned on the base opposite corresponding one of the leaves in the clover leaf pattern. The rim is symmetric with the clover leaf pattern and the springs.

The symmetric leaf structure and spring are micromachined from a single crystal semiconductor having a crystalline structure. The crystalline structure is aligned with the symmetric leaf structure and spring so that each primary defining surface of the spring and symmetric leaf structure lies parallel to a crystallographic plane of the semiconductor.

The circuit differentially senses the sensing signal from the sensing electrodes to reject common mode signals therefrom. The symmetric leaf structure has two resonant modes so that the symmetry of the symmetric leaf structure causes the two resonant modes to be matched in frequency. The circuit drives the drive electrodes and senses the sensing electrodes to operate the resonator as a microgyroscope, or in another embodiment drives the drive electrode and senses the sensing electrodes to operate the resonator as an accelerometer.

For the resonator to operate as a gyroscope, the normal modes of concern are the resonant modes which rock the leaf structure about an axis in the cloverleaf plane. In the symmetric leaf structure which has a two fold symmetry, the symmetry causes the two resonant modes to be matched or degenerate in frequency. The invention includes the concept that the resonator or leaf structure may be configured and arranged according to the teachings herein to have an n-fold symmetry and n resonant modes if desired, all of which would be degenerate. In the illustrated embodiment for the gyroscopic function, the drive voltage is applied to two adjacent electrodes to cause a rocking-like motion of opposing clover leaves about a null axis along the supporting springs. The motion is sensed by current differential measurements between the opposing clover leaves.

In another embodiment, the resonating structure can operate as an accelerometer. The normal modes of concern for the accelerometer are the up-and-down, in-phase correlated motion of all the clover leaves and one rocking mode. The sensing as always, is performed by using differential measurements. For a linear acceleration in the cloverleaf plane, the driver excites the normal mode that involves the in-phase correlated up-and-down vibrations of all four clover leaves, and the sensing circuit senses the tilt of the clover leaves induced by the linear acceleration applied to the central mass element. For acceleration along the post, i.e. the z-direction, the driver excites the rocking mode similarly as for the gyroscope, and the sensing circuit detects the acceleration induced in-phase correlated motion of the clover leaves.

For sensing acceleration in the x-y plane, the driver also excites the rocking mode and the differential signal between the sense electrodes are sensed. In the design, an asymmetric post is provided and under linear acceleration the post tilts. The tilting is sensed using lock-in amplification, the use of which amplification technique is the reason for oscillation of the leaf structure, namely to provide a frequency which can be used for lock-in detection.

The electrodes of the symmetric leaf structure on one hand and the sensing and drive electrodes of the rim/base structure on the other hand define enlarged coplanar opposing surfaces from each other for increased drive and sensing.

The invention is also defined as a method of operating a vibratory micromachined resonator comprising the steps of oscillating a micromachined symmetric leaf structure having a plurality of symmetrically disposed leaves about a center. The symmetric leaf structure includes at least one micromachined spring symmetrically disposed with respect to the symmetric leaf structure and supporting the symmetrical leaf structure for providing a restoring force to the symmetric leaf structure. Coriolis induced perturbations in the oscillating symmetric leaf structure are then sensed to detect motion or rotation of the resonator as a whole. As a result, sensing of motion is detected in a rugged, small, low cost, cost, high performance vibratory sensor.

The invention is also a method of fabricating a resonator, which includes a symmetric leaf structure and spring, comprising the step of micromachining the symmetric leaf structure and spring from a single crystal semiconductor having a crystalline structure. The crystalline structure is aligned with the symmetric leaf structure and spring so that each primary defining surface of the spring and symmetric leaf structure lies parallel to a crystallographic plane of the semiconductor. The method further comprises the step of fabricating an integrated circuit design for detecting motion of the symmetric leaf structure within the single crystal semiconductor from which the resonator is micromachined.

The invention, now having been briefly summarized, can be better visualized by turning to the following drawings wherein like elements are referenced by like numerals.

The invention and its various embodiments now having been visualized in the foregoing drawings, the preferred embodiments can be best understood by now turning to the following detailed description.

DETAILED DESCRIPTION OF THE PREFERRED EMBODIMENTS

The illustrated embodiment of the invention shall be described in terms of a microgyroscope, accelerometer and sensor, but it is to be understood that the principles and scope of the invention may be realized and implemented in any implementation consistent with the disclosed concepts and should not be limited to the following illustrations. Therefore, whereas the bulk of the illustrated embodiment shall be discussed in terms of a microgyroscope, it should always be kept in mind when reading the specification that the invention is to be more broadly construed and equally applicable to other types of applications.

Future spacecraft will require performance microgyroscopes that are compact and cost effective with low power consumption for attitude and maneuver control, tumble recovery, stabilization and pointing of instruments such as cameras, antennas, detectors and solar panels. Microgyroscopes with 0.1 to 10 degree per hour biased stability performance will also find application in inertial reference systems and in external inertial reference systems such as in the global positioning system (GPS), as sun sensors, or star trackers. For example, a sun sensor cannot be used during an eclipse, during periods of several minutes between star sightings within the narrow field of view star tracker, or when a GPS navigation signal suffers short term dropouts due to inadequate antenna coverage or physical electromagnetic interference. The disclosed microgyroscopes, therefore, will not only be useful for various extraterrestrial missions such as planetary or interplanetary astrophysical research, but also will have substantial terrestrial applications in automotive navigational systems, autonomous control of underwater and land vehicles, platform stabilization, a smart guidance for munitions, missiles and robotics. For example, the gyroscope of the invention can be used in a small handheld mobile navigation system in conjunction with and integrated with conventional GPS.

Recent attempts to implement vibratory microgyroscopes have faced several difficulties. To achieve resonance matching between the driven and sense modes requires extreme mechanical precision. To avoid electronic limitations due to parasitic capacitance, complex fabrication processes were also necessary. These prior vibratory microgyroscope designs typically have only a maximum mass value of approximately $10^{-10}$ kg, a minimum spring constant of approximately 1 N/m and resonant frequencies in the range of 20 to 30 KHz. The high resonant frequencies results in reduced signal outputs. The small mass leads to large damping and large Brownian noise. The small capacitance of the drive and sense structures limits the detection sensitivity. The design characteristics result in microgyroscopes that have drift rates that range from 30 to 5000 degrees per hour.

In the present invention the Q factor of microgyroscope 10 increases from about 10 at one atmosphere pressure to greater than 10,000 at less than one miliTorr. It is larger due to the low mechanical losses. The circuitry actively tracks frequency drifts in the drive resonance due to temperature changes and adjusts the drive frequency to always match the frequency of mechanical resonance. The circuit also actively detects and tracks the amplitude of the driven oscillation and actively corrects and maintains a constant drive amplitude.

The illustrated microgyroscope described below offers several technical features which include, but are not limited to:

(1) the use of simple bulk silicon technology which provides precise structures, increases yield, and reduces cost;

(2) high rotation rate sensitivity due to the low frequency resonator design, differential mode of operation, and lock in amplifier detection;

(3) a low loss resonator with a high Q factor for mechanical amplification;

(4) a symmetric resonator with frequency matched resonant modes and reduced temperature variation dependence;

(5) the gyroscope utilizes energy transfer between two degenerate modes to sense rotation rate; and (6) symmetric damping for all the degenerate modes.

In vibratory gyroscopes in general, there is a rotation sensing mechanical element which is initially driven to oscillate in a first mode, typically termed an input or drive mode. Under rotation, Coriolis acceleration induces energy transfer from the input mode to a second oscillatory mode, typically termed an output or sense mode, which causes the sensing element to be excited. The best performance for a vibratory gyroscope is obtained when the oscillatory modes, the drive and sense modes, have the same resonant frequency and a high quality or Q factor. The response to the Coriolis acceleration is then mechanically amplified by the Q factor of the resonance and results in improved sensor performance.

Figure 1:
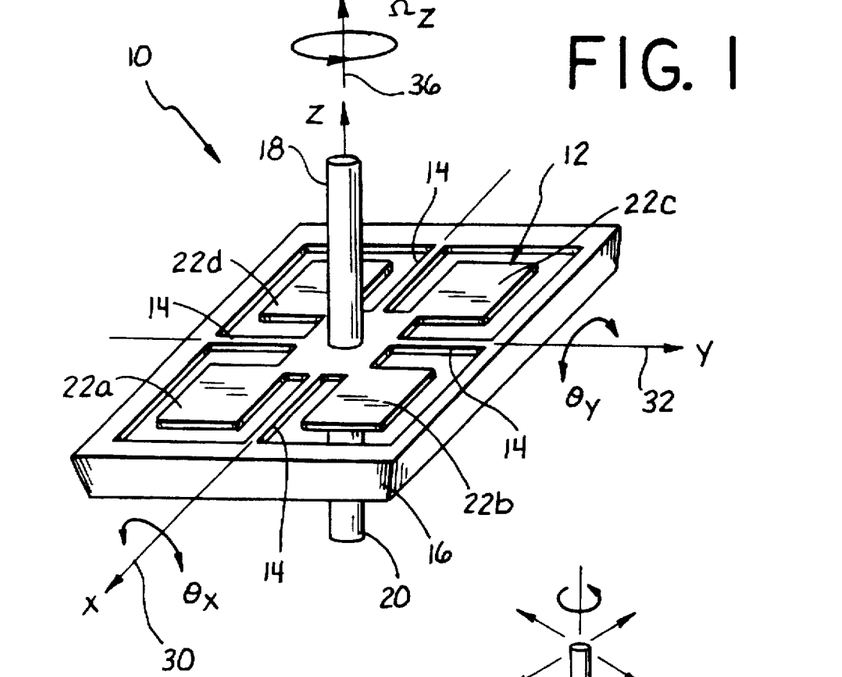
FIG. 1 is a perspective view of the symmetric leaf structure, springs, rim and post of the invention when employed as a microgyroscope.

A simplified perspective view of a portion of the microgyroscope of the invention is depicted in the perspective view of FIG. 1. The microgyroscope, generally denoted by reference numeral 10, in the illustrated embodiment is comprised of a 4-leaf clover, generally denoted by reference numeral 12, suspended by four wires or springs 14 extending between clover 12 and rim 16. In the preferred embodiment a two-fold symmetric clover leaf pattern with square leaves 22a–d is used, but any symmetric, planar pattern may be substituted if desired. For example, if desired six or eight leaf clover pattern could be used or even more complex symmetric patterns chosen if desired. For example, multiply lobed cluster patterns or grape clusters having two fold symmetry could also be utilized in the same manner as disclosed here for a four leaf clover pattern. A square, four-leaf pattern is preferred for ease of fabrication as will become apparent in connection with the following description. Rim 16, clover structure 12 and springs 14 are micromachined from a single crystal of silicon. In the preferred embodiment, a metal or brass post 18 is rigidly attached through a center 20 of clover structure 12 in a direction perpendicular to the plane of clover leaves 22a–d. Four silicon suspension springs 14 provide mechanical support and a restoring spring force for the oscillatory motion of microgyroscope 10. Clover leaf structure 12 and metal post 18 have a combined mass in the illustrated embodiment of about $10^{-5}$ kg. Microgyroscope 10 is shown as best measuring the rate of rotation about the inertial Z axis parallel to the post. Three of such microgyroscopes each oriented in a different orthogonal direction will thus provide three axis sense rotation.

Figure 2:
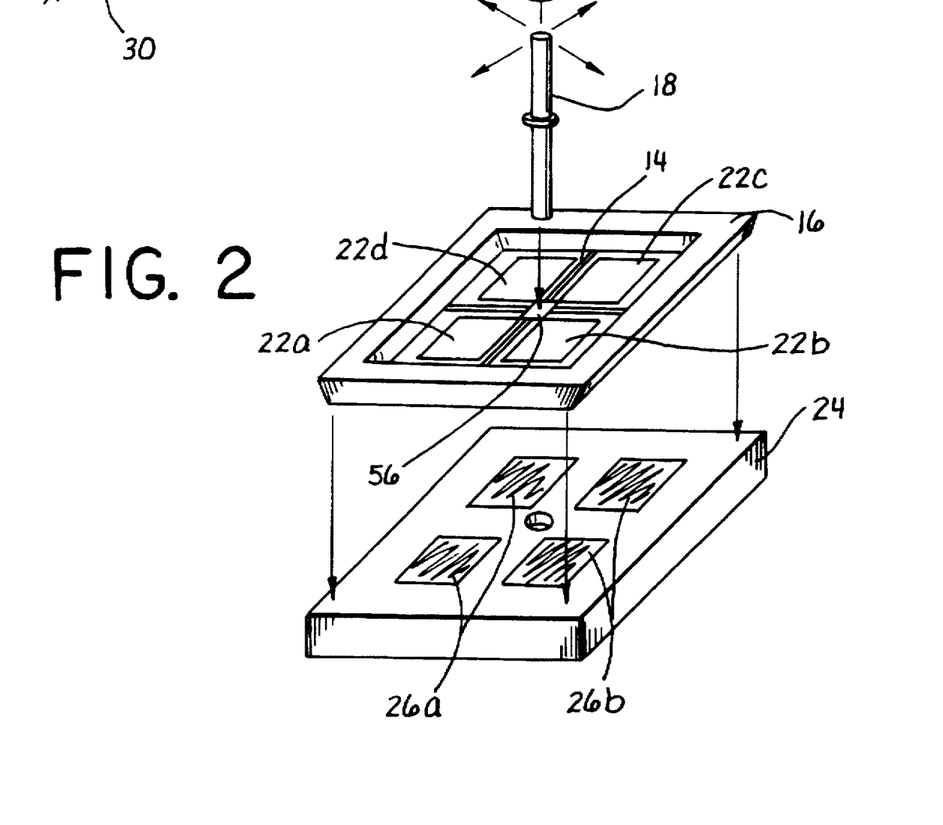
FIG. 2 is an exploded perspective view of the microgyroscope of FIG. 1 also showing a quartz base plate.

The mechanical resonant frequency of the microgyroscope in the illustrated embodiment of FIGS. 1 and 2 varies according to its design in the range of 200 to 1000 Hz. The resonant frequency may be chosen at any frequency consistent with the teachings of the present invention. The low resonant frequency in the illustrated embodiment as compared to prior art vibratory gyroscopes is due to a large mass of post 18 and the softness of suspension springs 14. Since the Coriolis response of gyroscope 10 is inversely proportional to its resonant frequency, a low resonant frequency increases the device responsitivity.

Figure 3:
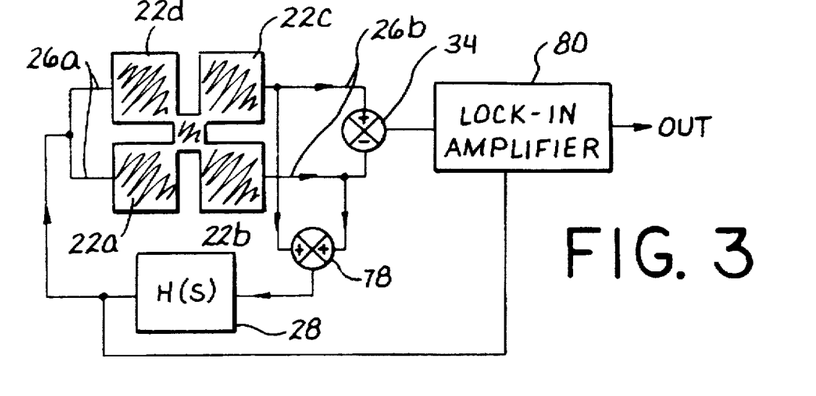
FIG. 3 is a block diagram of the circuitry for driving and sensing signals from the gyroscope of FIGS. 1 and 2.

Silicon clover leaf structure 10 with post 18 is bonded to a quartz base plate 24, as best depicted in the exploded perspective view of FIG. 2. Quartz base plate 24 is patterned with Cr/Au electrodes 26a and b. The large planar overlap of clover leaves 22a–d to electrodes 26a and b provides large areas for electrostatic driving and capacitive sensing. Each of electrodes 26a and b are coupled through metalizations (not shown) leading to silicon electronics as shown in FIG. 3. In the preferred embodiment gyroscope 10 and its associated electronics are integrally fabricated by using conventional silicon integrated circuit processing technology. The resonator combination of electrodes 26a and b and clover leaves 22a–d is excited by applying an AC voltage from an automatic gain control amplifier 28, symbolically representing the transfer function of all the electronics, to electrodes 26a, which are associated with leaves 22b and c. This excites a rotation of leaves 22b and c around the X-axis 30 as depicted in FIG. 1. Since the resonator of gyroscope 10 is symmetric, that is each of the elements comprising any part of the oscillating elements within gyroscope 10 has mirror symmetry about both the X and Y axes, the resonance modes about the X axis 30 and Y axis 32 are matched in frequency with a rocking-like displacement of clover leaves 22a–d. The rocking of leaves 22a and 22d is sensed capacitively through electrodes 26b and are coupled to differential amplifier 34 shown in FIG. 3. The degeneracy of the drive and sense modes in gyroscope 10 allows Q factor amplification of the modal displacements.

The Q factor amplification of the drive and sense motion also reduces the drive voltage needed from agc amplifier 28 and increases the sensitivity of output provided to the differential amplifier 34. The Q factor of this symmetric resonator structure can be very high, since the structure can be perfectly balanced as described below with a fixed center of gravity largely defined by the placement of metal post 18 with its center of gravity at or very near the geometric center of the plane of clover leafs structure 12. The linear forces and moments resulting from vibration modes thus can be zero or very near zero.

Since post 18 is rigidly attached to clover leaf structure 12, the movement of clover leaves 22a–d translates into movement of post 18, which can be viewed conceptually as a double pendulum. When leaves 22a and d oscillate in the drive mode, the displacement of post 18 is nearly parallel to the Y-axis 32 direction. As an external rotation is applied in the direction of Z axis 36, a Coriolis force acts on oscillating post 18 causing it to be displaced in the orthogonal direction, namely in this illustration initially in the X direction 30. For a rigid post and leaf structure combination the post displacement is translated back into a rocking motion about Y axis 32 of clover leaves 22a–d. Post 18 thus provides a large Coriolis coupling which transfers energy between the two orthogonal rocking modes about X axis 32 aligned with springs 14 extending between clover leaves 22a and b on one hand and clover leaves 22c and d on the other, and springs 14 aligned with X axis 30 extending between clover leaves 22a and d on one hand and clover leaves 22b and c on the other.

Before considering further aspects of the control and signal read out, consider first the fabrication of gyroscope 10. The structure of silicon microgyroscope 10 shown in FIG. 2 can be characterized as a quartz based plate 24 patterned with metal electrodes 26a and b and a silicon clover leaf resonating structure 12 suspended inside a silicon rim 16. Quartz base plate 24 and silicon rim 16 can be bonded together by several methods, for example by using low shrinkage ultraviolet curable epoxy or other methods of equivalent bonding such as by conductive epoxy or wafer bonding. In the illustrated embodiment the overall dimension of mechanical resonator 12 is 7×7 mm and the dimension of each clover leaf 22a–d is about 1.1 mm by 1.1 mm. Post 18 is 500 microns in diameter and 5 mm in length. Quartz base plate 24 is a square 1 cm by 1 cm and approximately 400 microns thick. The sensing capacitors of microgyroscope 10 are formed between the chromium/gold electrodes 26b on quartz base plate 24 and silicon clover leaves 22a and d. The gap between base electrodes 26b and clover leaves 22a and d is typically in the range of 10 to 20 microns.

The fabrication of the silicon clover leaf resonating structure requires only two etching and masking steps using bulk micromachining technology. As best illustrated FIGS. 4a–d, which are a simplified cross-sectional diagrams of the fabrication process, the fabrication methodology begins with a standard n-type or phosphorous or arsenic doped, <100>, double-sided polished silicon wafer 38 that has two epitaxial silicon layers 40 and 42 disposed thereon. The first epitaxial layer 40 is a p+ etch-stop layer, which in the illustrated embodiment is a $10^{20}$ boron doped layer. Upper layer 42 is a 26 micron n-type silicon epilayer. A silicon dioxide layer 44 is thermally grown on the wafer and then patterned with the clover leaf pattern depicted in FIGS. 1 and 2. This patterned oxide layer 44 is used as a mask for EDP etching of silicon layer 42 down to etch-stop layer 40, resulting in the fabricated pattern as shown in the cross-sectional view of FIG. 4a. The longitudinal axis of spring 14 and their etched surfaces, the edges of clover leaves 22a–d, and all of the features of the resonator comprising the geometry of rim 16, clover leaves 22a–d and springs 14 are aligned with the crystallographic axis of wafer 38 so that their edge surfaces are extremely smooth and lie along defined crystalline planes. Therefore, very precise dimensions and shapes for springs 14 as well as each of the other edges are provided by the anisotropic EDP etch. This not only provides a very precisely symmetric resonating structure, but provides symmetric mechanical parameters for springs 14 which are material to establishing the degenerate modal responses and resonant frequencies of microgyroscope 10. One of the most difficult problems in the prior art was to provide designs which could avoid any kind of asymmetry, which strongly effects the modal frequencies and prevent degeneracy in the drive and sensed resonances.

Figures 4A, 4B, 4C, 4D:
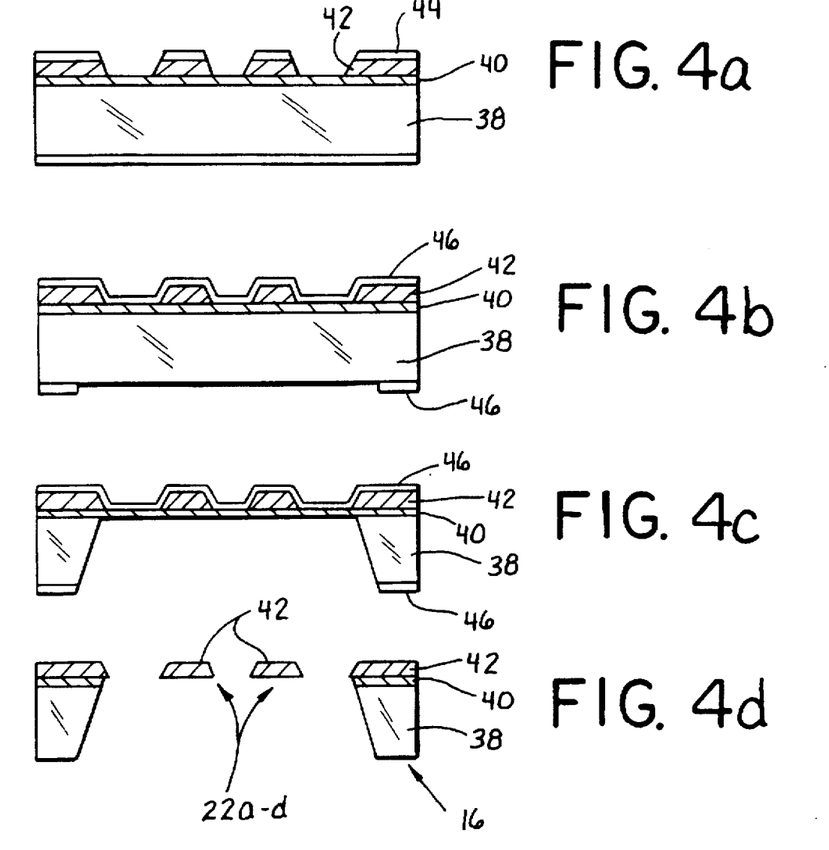
FIGS. 4a–d are cross-sectional side views of the fabrication steps of the gyroscope of FIGS. 1 and 2.

Thermal oxide mask 44 is stripped off with a wet, buffered hydrofluoric etch and is then followed by 300 angstrom thick thermal silicon dioxide layer 46 resulting in the structure of FIG. 4b. Silicon dioxide layer 46 on the back of microgyroscope 10 is patterned as shown in FIG. 4b and then etched to remove almost all of the silicon substrate 36 down to etch-stop layer 40 as shown in the resulting structure in FIG. 4c. Next, wafer 38 is cleaved into individual devices and separated. The cleaved devices are then etched in hydrofluoric acid until stop-etch layer 40 is removed resulting in the structure as shown in FIG. 4d. Removal of both etch-stop layer 40 and silicon dioxide layers 46 removes any stress gradients which might otherwise tend to cause warpage of the suspended clover leaf structure 22a–d and hence loss of symmetry.

Figure 5A:
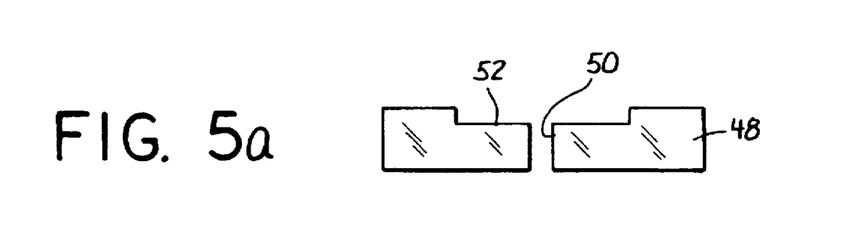
FIGS. 5a and b are cross-sectional side views of the fabrication steps of the base plate of the gyroscope of FIGS. 1 and 2 as shown in FIG. 2
Figure 5B:
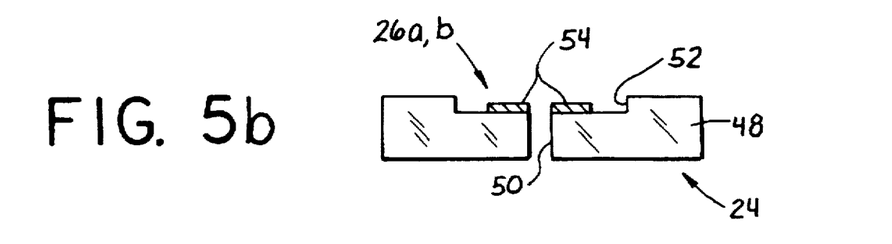

The fabrication process for quartz based plate 24 is depicted in FIGS. 5a and b, which again show the fabrication steps in side cross-sectional view. Quartz plate 48 is first drilled to define a bore 50 for post 18. Plate 48 is then patterned and etched to a depth of approximately 10 to 20 microns using hydrofluoric acid to define a well 52. Well 52 provides a spacing gap that separates silicon clover leaves 22a–d and electrodes 26a and b on quartz base plate 24. Next a chromium/gold metalization is evaporated onto quartz plate 48 as shown in FIG. 5b to define electrodes 26a and b. Quartz plate 48 is then diced into individual devices to define individual device quartz base plates 24 and are bonded to the silicon resonator structure described in connection with FIGS. 4a–d using a UV curable epoxy or conductive epoxy or any other bonding methods. The devices are tested for resonant frequency and mode shapes. After the initial test, metal post 18 is then epoxied into a central bore 54 as shown in FIG. 2 defined in clover leaf resonator 22a–d.

Figure 6:
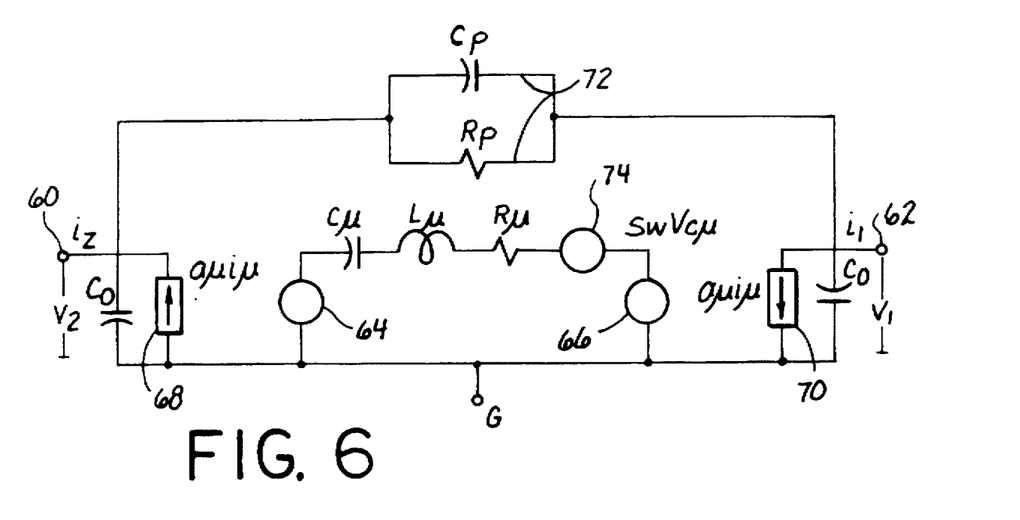
FIG. 6 is a circuit model of the dynamic performance of a pair of leaves of the type shown in FIGS. 1 and 2.

The structure of the device now having been described in connection with FIGS. 1 and 2 and its fabrication in connection with FIGS. 4a–d and 5a and b, consider in further detail the electronics shown in FIG. 3 of actuating and sensing microgyroscope 10. For the purposes of visualization, an electrical model of gyroscope 10 is depicted in FIG. 6 into which the more significant parasitic effects are inserted such as interplate capacitances and the mechanical coupling between the orthogonal modes under no rotation. FIG. 6 shows a basic electrical model which gives the excitation-to-sense transfer function $V_2/V_1$ or $V_3/V_4$, of microgyroscope 10 taking each pair of opposite plates at a time, wherein the voltages $V_1$–$V_4$ correspond to the angular displacements of clover leaves 22a–d respectively. The mechanical resonance of silicon clover leaf resonator 22a–d is modeled by series resonant circuit 58 comprised of LμCμRμ which is excited by dependent voltage sources 64 and 66 denoted as $\delta V_1$ and $\delta V_2$ respectively, which communicate with port voltages 60 and 62, denoted at $V_1$ and $V_2$ respectively. The δ representation signifies the deflection per volt in plates 22a–d at zero frequency.

Figure 7:
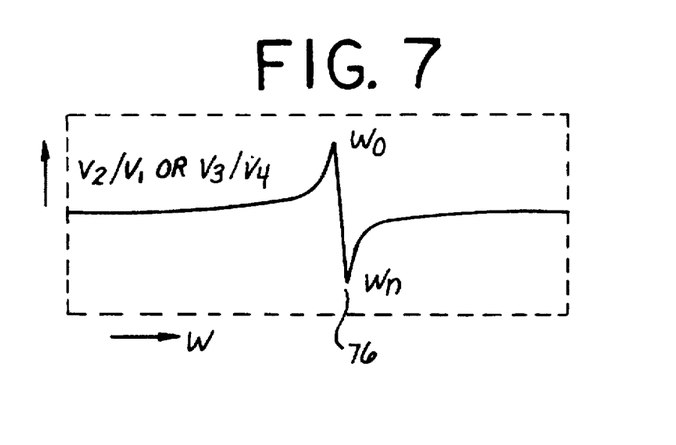
FIG. 7 is a graph of the excitation-to-output transfer function of the device modeled by the circuit of FIG. 6 as a function of frequency.
Figure 8:
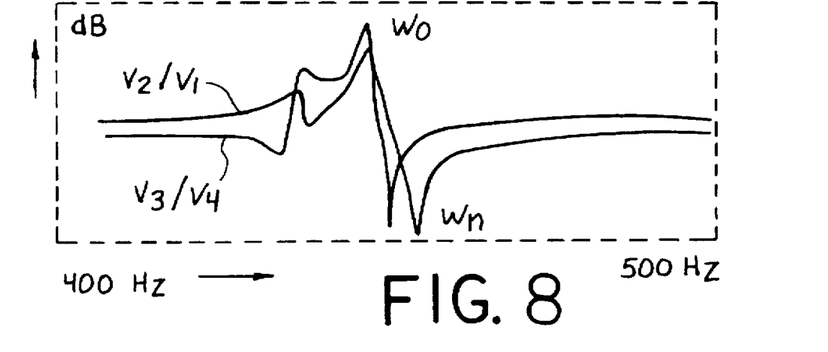
FIG. 8 is an actual measured graph of the excitation-to-output transfer function of the gyroscope of FIGS. 1 and 2 as a function of frequency.

The effective mechanical motion on electrical ports 60 and 62 in turn is given by dependent sources 68 and 70, denoted as $a_\mu i_\mu$. The interplate parasitic resistance and capacitance is modeled by parallel RC circuit 72, Rp and Cp. Dependent source 74, $\delta_\omega V_{c\mu}$ is the Coriolis induced term described below. The transfer function predicted by the model of FIG. 6 with ω=0 and hence $\delta_\omega$=0 is depicted in FIG. 7 in which is notch 76 at ω=$\omega_n$ is mainly due to parasitic capacitance 72, Cp. FIG. 7 shows a transfer functions $V_2/V_1$ or $V_3/V_4$ in the vertical axis in a logarithmic scale with frequency graphed along the horizontal access. An actual experimental transfer function as measured is shown in FIG. 8 of each pair of opposite plates of microgyroscope 10 with drive and sense resonant modes at 445 Hz and 435 Hz respectively. The departure of each of these transfer functions from the predicted function of FIG. 7 for a pair of single plates is primarily caused by parasitic electrical and mechanical coupling between the two orthogonal modes when gyroscope 10 is at rest and by a slight difference between the δ and $\alpha_\mu$ for each pair of plates.

Figure 9:
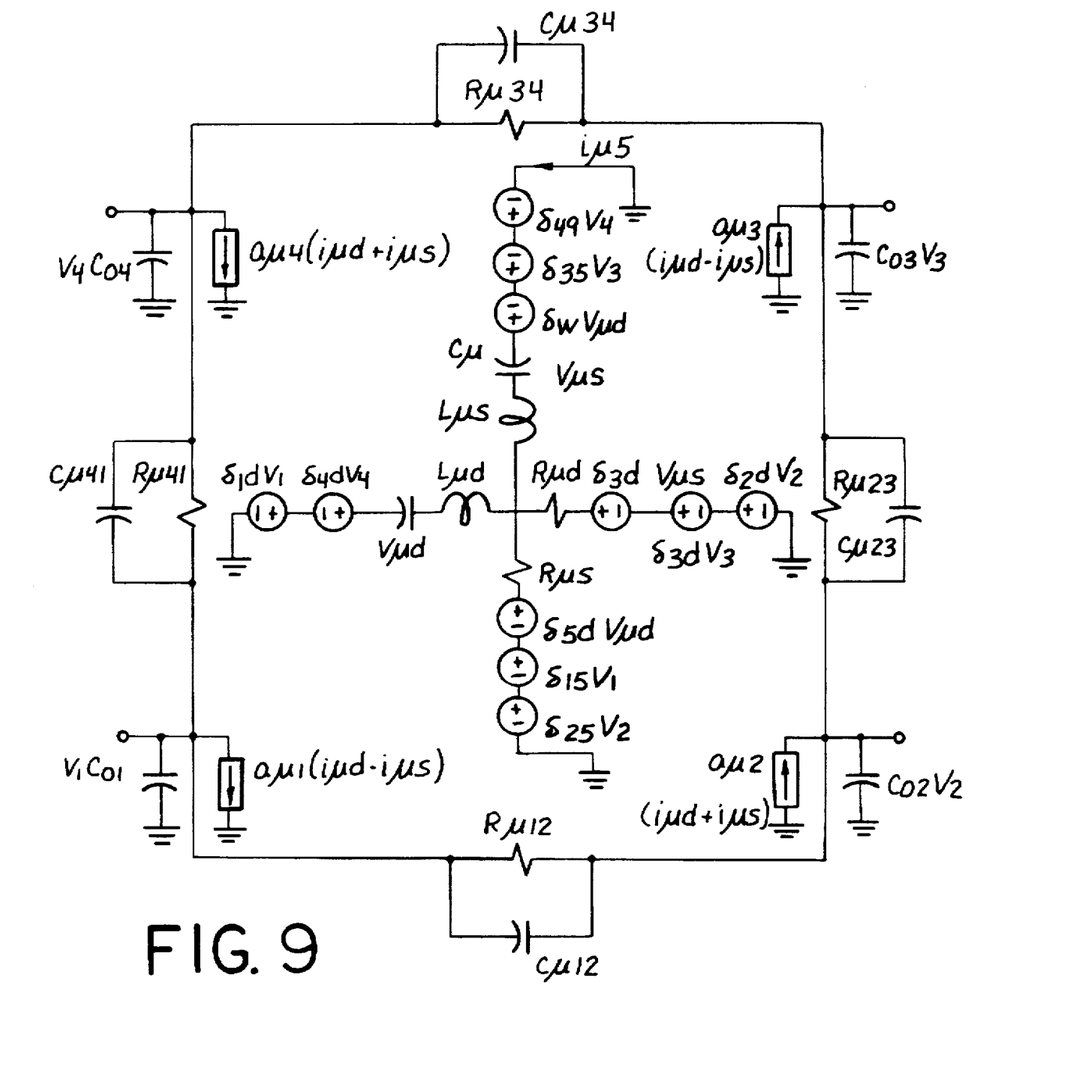
FIG. 9 is a circuit model of the dynamic performance of two pair of leaves of the gyroscope of FIGS. 1 and 2.
Figure 10:
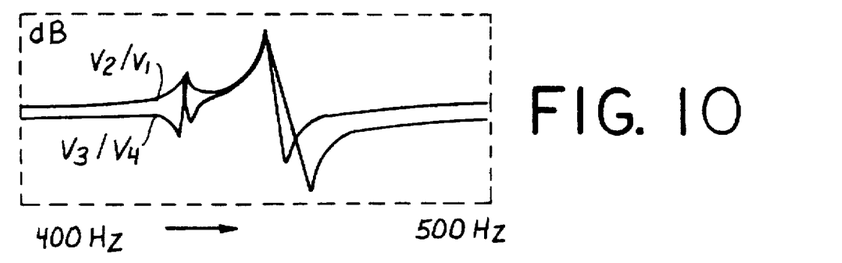
FIG. 10 is a graph of the excitation-to-output transfer function of the device modeled by the circuit of FIG. 9 as a function of frequency.

The model of FIG. 6 is a model for only a single pair of plates. The complete electrical model for gyroscope 10 is shown in FIG. 9, where the subscripts 1–4 refer respectively to the performance parameters of clover leaves 22a–d respectively in analogy with the same designations discussed above in connection with FIG. 6. The transfer functions for the model of FIG. 9 again are depicted in FIG. 10 and correspond substantially to those measured in FIG. 8.

The actuation or drive circuitry is realized by designing agc amplifier 28 so that it locks into the drive resonance mode. The driving voltage of microgyroscope 10 from agc amplifier 28 varies from approximately 0.5 to 10 volts peak to peak depending on the device design and Q factor with the snap down voltage at approximately 20 volts, i.e. the voltage necessary to retain clover leaves 22a–d in a down position against the restorative force of springs 14. The diagram of FIG. 3 shows clover leaves 22a–d exposed above and covering underlying electrodes 26a and b so that is should be understood that the conductive lines shown in the circuitry of FIG. 3 are not directly electrically coupled to clover leaves 22a–d, but to their underlying electrodes. The diagram of FIG. 3 symbolically places clover leaves 22a–d over and obscures electrodes 26a and b for the purposes of ease of visualization of the drive provided through electrodes 26a and b to clover leaves 22a–d. As shown, the signals from electrodes 26b, the sensing electrodes, are both differenced in differential amplifier 34 and summed in summing amplifier 78. The purpose of summing sense signals from electrodes 26b is to remove the difference signal between them and hence the response of the sensed resonance from the feedback loop. The output of summing circuit 78 is fed back to agc amplifier 28 to provide a feedback signal to agc amplifier 28 independent of the sensed response. The sense circuit, differential amplifier 34, on the other hand, subtracts the sensed signals from electrodes 26b in order to remove the common mode drive signal. A lock-in amplifier 80 is used to detect the differential signal caused by the rotation of gyroscope 10 about the z axis. The output of agc amplifier 28 is also provided as the reference signal to lock in amplifier 80.

By way of example, in tests of an initially fabricated microgyroscope 10, the resonant frequency of the drive mode has been measured at 452 Hz and the sense mode at 447 Hz with Q factors for both modes at approximately 500. The resonant modes are rocking modes of modal lines along the spring directions, i.e. the longitudinal directions of springs 14. The separation between the resonant frequencies in the sense and drive modes was primarily due to stress from the bonding of silicon clover leaf structure 22a–d and rim 16 to quartz base plate 24 and to small fabrication errors. By improved bonding technique and fabrication, the frequency split between the sense and drive modes has been substantially narrowed in later fabricated microgyroscopes and has resulted in significant Q factor amplification of the sense mode displacement.

Figure 11:
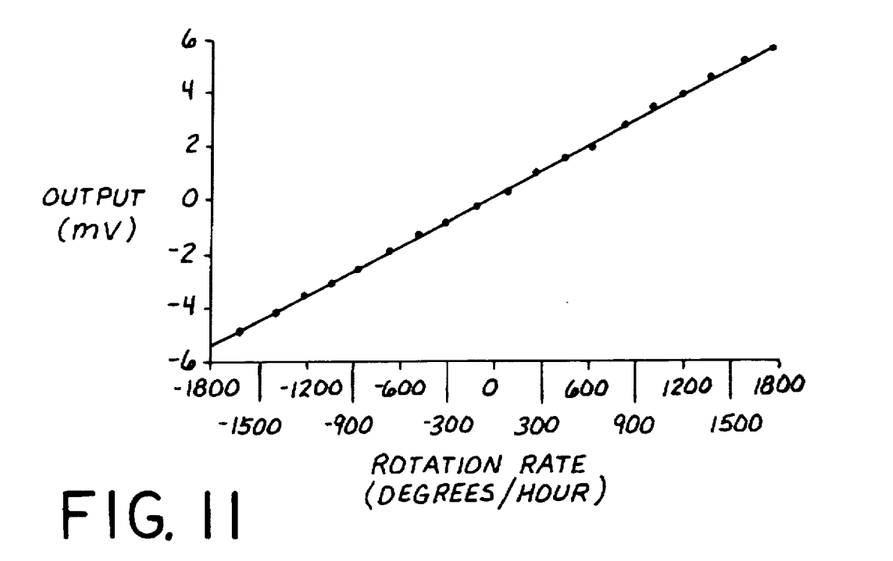
FIG. 11 is a graph of the measured rotation rate responsitivity of the gyroscope of FIGS. 1 and 2.

The output voltage, $V_{out}$, for the initially fabricated microgyroscope and circuitry of FIG. 3, is graphed against rotation rate measured in degrees per hour as depicted in FIG. 11. The measured responsitivity or scale factor of gyroscope 10 is linear and was measured at 10.4 millivolts per degree per second with a nonlinearity of at less than 1% at an integration time of one second. Closed circuitry may be employed to improve the sensitivity of microgyroscope 10 by lowering noise and reducing drift.

Theoretically, the microgyroscope of the invention is capable of detecting rotation rates of less than one degree per hour with rotation rates of 90 degrees per hour currently being realized. While the illustrated embodiment shows resonant frequencies between 400 and 500 Hz, it is anticipated that resonant frequencies between approximate 0.1 to 10 kHz can be realized by design selection. Because of the increased sensitivity of the design it may also be driven off resonance thereby eliminating the need for mechanical matching between the sensed and driven modes.

Figure 12:
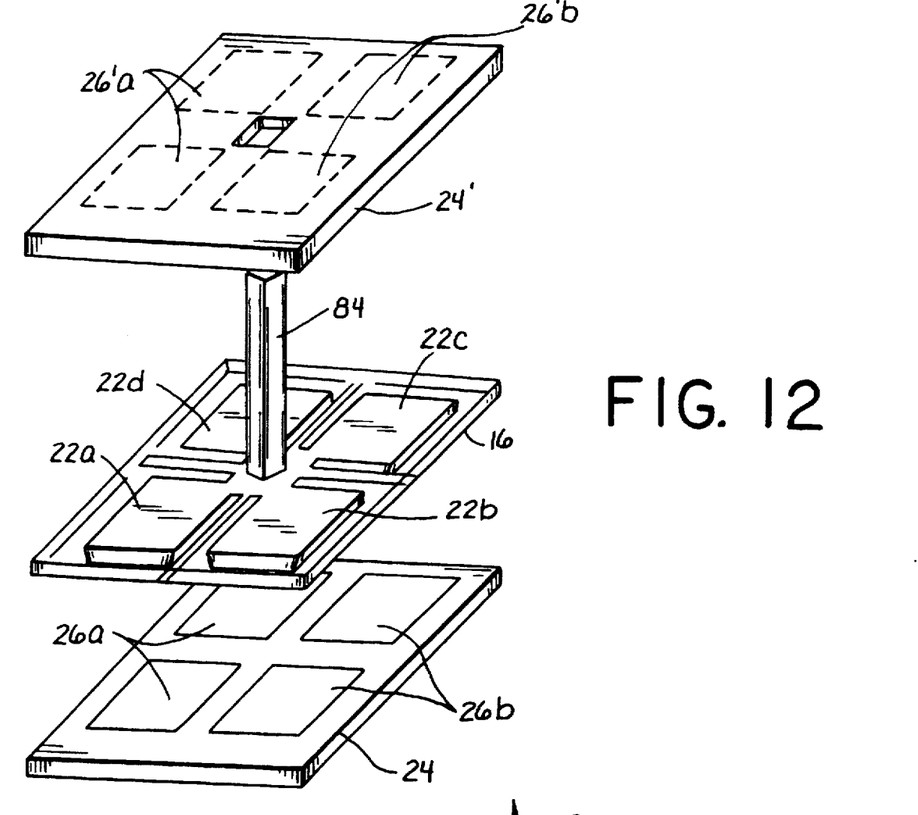
FIG. 12 is an exploded perspective view of another embodiment of the invention when employed as an accelerometer.

Although the preferred embodiment utilizes normal modes around the X and Y axis, it is also within the scope of the invention that modes along the axis displaced 45° from the X and Y axis may also be utilized. In this case, clover leaves 22a–d would be paired as leaves 22a and c on one hand and 22b and d on the other. A modification of the microgyroscope 10 as diagrammatically depicted in FIG. 12 provides for a three axis accelerometer denoted generally by reference numeral 82. The elements of accelerometer 82 are identical with those of gyroscope 10 with the exception that post 18, which has its mass symmetrically disposed with respect to clover leaves 22a–d in the embodiment of FIGS. 1–11, is provided as an asymmetric post, or more specifically a half post 84 in the illustration of FIG. 12. Post 84 is also shown as a square pest as opposed to a rod. The cross-sectional configuration of post 84 is largely a matter of design choice and fabrication convenience. Each of the elements in FIG. 12 coact substantially as indicated above with the exception that a second identical base plate 24' is shown in the exploded perspective view of FIG. 12.

Consider the operation of the embodiment of FIG. 12. For example, initially, all four clover leaves 22a–d and post 84 are driven to oscillate in a Z direction. Under an input acceleration in the positive X direction, post 84 tilts toward the negative X direction. Thus the motion of post 84 is a superposition of oscillatory Z motion and negative X motion. Since post 84 is rigidly attached to clover leaves 22a–d, the leaves also experience the same motions. The motion of leaves 22a–d thus produce an oscillating asymmetric capacitance between clover leaves 22a–d and corresponding base electrodes in base plates 24 and 24'. The asymmetry of the capacitance is detected using a lock-in amplifiers described above in connection with FIG. 3 locked onto the resonant frequency of the Z oscillation. By this means the signal-to-noise ratio the signal is increased as is the sensitivity of the accelerometer 82. The measure of the asymmetry of the oscillating capacitance between the electrodes is directly related to the linear acceleration. Since accelerometer 82 is symmetrical in the X-Y plane, it is capable of sensing both accelerations in the X and Y direction. Acceleration in the Z direction can also be detected by monitoring capacitances associated with each of the four clover leaves 22a–d. Under accelerations in the Z direction, all four clover leaves 22a–d will move up or down depending on the direction of acceleration superimposed upon the drive oscillation. This additional Z-movement of clover leaves 22a–d is capacitively detected between the clover leaves and base electrodes in base plates 24, 24'. Thus, by monitoring capacitance changes of all four clover leaves 22a–d, acceleration in all three directions can be determined. Accelerations in the nano g range are realized by appropriate design selections of operating parameters.

Figure 13:
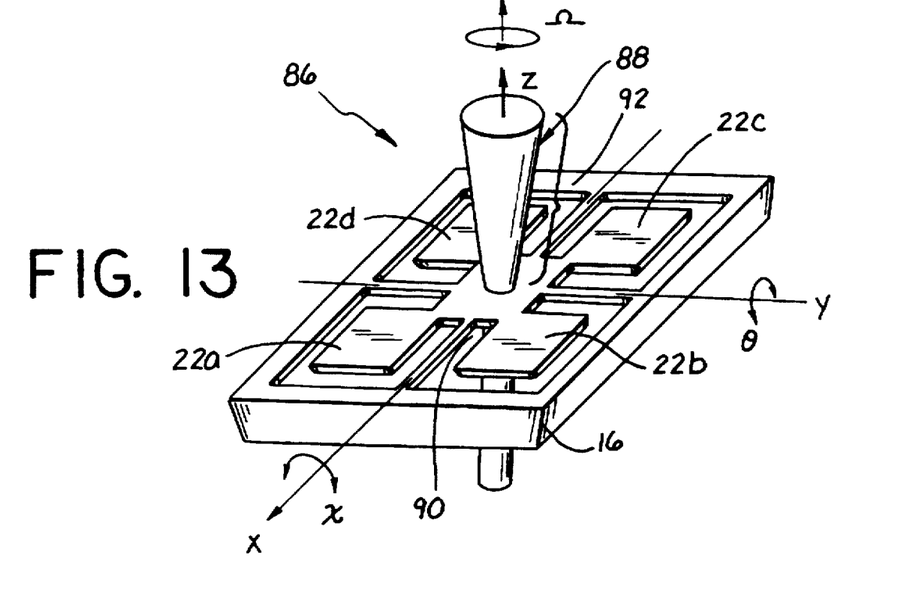
FIG. 13 is a perspective view of a third embodiment of the invention when used as a hybrid gyroscope and accelerometer.

It is further within the scope of the invention that the accelerometer FIG. 12 may be combined with a microgyroscope of FIGS. 1–11. As seen in the diagrammatic depiction of FIG. 13 a hybrid device, generally denoted by reference numeral 86, having essentially the same elements as FIGS. 1–12, is provided wherein post 18 and 84 is replaced by an asymmetric post 88. An illustrated embodiment post 88 is shaped as cylindrical rod in its lower portion 90, while it has a conical shape on its upper portion 92. The asymmetric distribution of mass within rod 88 thus combines the gyroscopic response of the embodiment of FIGS. 1–11 with the accelerometer response of FIG. 12. In this case the drive mechanism also becomes a superposition of Z oscillation of accelerometer 82 combined with the rotational drive of the gyroscope of FIGS. 1 and 2. The operational responses are then decoded or separated from each other in the output circuitry which includes algorithmically controlled data signal processing for this purpose.

Alternatively, it may be possible to multiplex between rotational and translational oscillatory drive modes in an appropriately damped system, which may contemplate the operation of hybrid device 86 within a fluidic environment as opposed to an gas, air or partial vacuum environment contemplated for the device of FIGS. 1–12.

Figure 14:
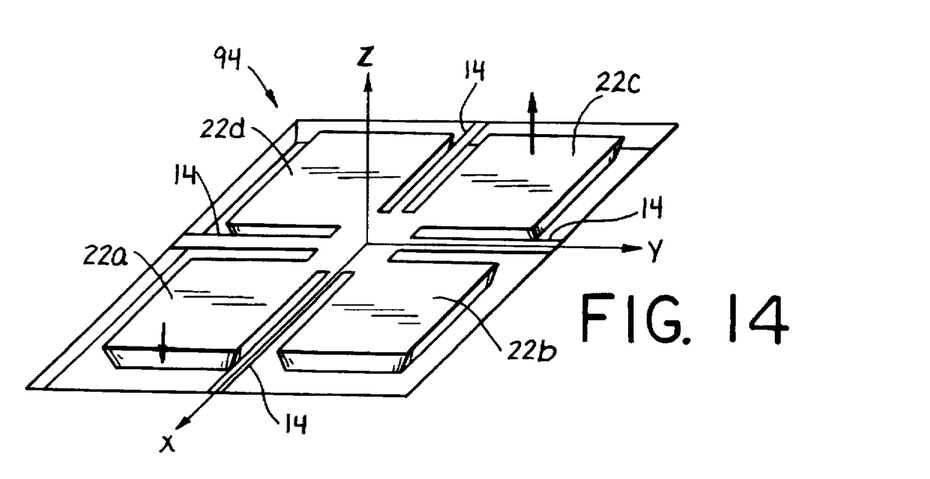
FIG. 14 is a perspective view of a fourth embodiment of the invention when used as a vibratory sensor.

FIG. 14 is a perspective view of another embodiment of the invention wherein clover leaves 22a–d are utilized together with rim 16 and springs 14 in combination with an electrode base substrate 24 in the absence of any central mass or bar 18, 84 or 88. This embodiment device is used as a resonator, generally denoted by reference numeral 94, in substantially the same manner as described in connection with gyroscope 10 in FIGS. 1–11. The Q factor of resonator 94 is expected to exceed 50,000 when driven at its resonant frequency. Each of the advantages utilized in microgyroscope 10 arising from the symmetry of springs 14, clover leaves 22a–d and rim 16 are also realized in resonator 94 of FIG. 14. This includes frequency matching of resonant frequencies for both input and output vibrational modes and differential temperature dependence between the two oscillatory modes. The high Q factor could thus be utilized in any type of transducer of physical phenomena for producing an output signal.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, although the illustrated embodiment has been described as micromachined from silicon with a quartz base plate and brass post, the entire the device could be made from silicon, metal, plastic, ceramic, any other crystalline or noncrystalline material or combinations of the same. For example, the quartz base plate and post are currently contemplated as being replaced by a silicon ones or versions made from plastic, ceramic, any other crystalline or noncrystalline material.

Further, although micromaching is the preferred mode of manufacturing, manufacturing of the element by mold injection or any other means now known or later devised is equivalent.

While the resonant modes in the illustrated invention are described as being aligned with the spring axes, it is also clear that modal oscillations can be established along non-aligned axes as well.

Still further, while the invention has largely been illustrated in terms of a gyroscope, its application in an accelerometer has also be briefly described. It could also be included in a vibration sensor, a seismometer, a pressure sensor, an actuator for the displacement of fluids, gases and particles, an optical beam deflector, steerer and mirror, a resonator reference or oscillator, and an oscillator for use in electromechanical apparatus. The invention can be employed in each of the above applications with oscillation. The leaf structure is oscillated primarily to enhance the signal-to-noise ratios by the use of lock-in detection, and secondarily to operate as a vibratory gyroscope. In nongyroscopic applications or applications where lower signal-to-noise ratios can be tolerated, oscillation of the leaf structure is not required.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A micromachined resonator comprising:

a micromachined symmetric leaf structure having a plurality of symmetrically disposed leaves about a defined center;

at least one micromachined spring symmetrically disposed with respect to said symmetric leaf structure and supporting said symmetrical leaf structure;

a rim/base structure to which said spring is coupled, said rim/base structure including a plurality of sensing and drive electrodes; and a circuit electrically coupled to said electrodes included within said rim/base structure, said circuit for providing drive signals to said drive electrodes to oscillate said symmetric leaf structure and to receive a sensing signal from said sensing electrodes to detect response of said oscillating symmetric leaf structure to physical phenomena exterior to said micromachined resonator, whereby a rugged, small, low cost, high performance vibratory sensor is provided.

2. The resonator of claim 1 wherein a plurality of said springs are provided for coupling and supporting said symmetric leaf structure to said rim/base structure.

3. The resonator of claim 2 wherein said plurality of springs are symmetrically disposed with respect to said symmetric leaf structure.

4. The resonator of claim 3 wherein said symmetric leaf structure and plurality of springs are symmetric about at least two separate axes.

5. The resonator of claim 4 wherein one of said two separate axes of symmetry of said symmetric leaf structure and a plane in which said plurality of springs lie are orthogonal to each other.

6. The resonator of claim 5 further comprising a mass element coupled to said symmetric leaf structure.

7. The resonator of claim 6 wherein said mass element is symmetrically disposed to said symmetric leaf structure.

8. The resonator of claim 7 wherein said symmetric leaf structure is substantially defined in a plane and said mass element extends in a direction substantially perpendicular to said plane of said symmetric leaf structure.

9. The resonator of claim 8 wherein said mass element is a cylinder disposed through a center of mass of said symmetric leaf structure.

10. The resonator of claim 6 wherein said circuit drives said drive electrodes and senses said sensing electrodes to operate said resonator as a microgyroscope.

11. The resonator of claim 1 wherein said symmetric leaf structure is a clover leaf pattern comprised of four leaves symmetrically disposed about said center and wherein said clover leaf pattern is disposed within a plane.

12. The resonator of claim 11 further comprising four springs connected to said clover leaf pattern and symmetrically disposed between each of said four clover leaves to connect said center with said rim/base and to support said clover leaf pattern relative to said rim/base structure.

13. The resonator of claim 12 wherein said rim/base structure comprises a rim disposed in said plane of said clover leaf pattern and a base disposed beneath said rim and coupled to said rim.

14. The resonator of claim 13 wherein said electrodes provided within said rim/base structure are provided on said base, two electrodes being provided as said drive electrodes and two electrodes being provided as said sensing electrodes, said driving and sensing electrodes positioned on said base opposite corresponding ones of said leaves in said clover leaf pattern, each of said driving and sensing electrodes being positioned opposite a different one of said leaves.

15. The resonator of claim 13 wherein said rim is symmetric with said clover leaf pattern and said springs.

16. The resonator of claim 1 wherein said circuit differentially senses said sensing signal from said sensing electrodes to reject common mode signals from said sensing electrodes.

17. The resonator of claim 1 wherein said symmetric leaf structure has at least two resonant modes and wherein symmetry of said symmetric leaf structure causes two resonant modes to be degenerate.

18. The resonator of claim 1 wherein said leaves of said symmetric leaf structure and said sensing and drive electrodes of said rim/base structure define large coplanar opposing surfaces from each other for increased drive and sensing.

19. A method of operating a vibratory micromachined resonator comprising the steps of:

oscillating a micromachined symmetric leaf structure having a plurality of symmetrically disposed leaves about a defined center, said symmetric leaf structure including at least one micromachined spring symmetrically disposed with respect to said symmetric leaf structure and supporting said symmetrical leaf structure for providing a restoring force to said symmetric leaf structure; and     sensing Coriolis perturbations caused in said oscillating symmetric leaf structure;

whereby motion is detected in a rugged, small, low cost, high performance vibratory sensor.

20. The method of claim 19 where said step of sensing Coriolis perturbations is capacitively performed between said symmetric leaf structure and a plurality of sensing and drive electrodes disposed in a rim/base structure to which said spring is coupled.

21. The method of claim 20 where said step of sensing is performed by a circuit electrically coupled to said electrodes included within said rim/base structure, said circuit providing drive signals to said drive electrodes to oscillate said symmetric leaf structure and to receive a sensing signal from said sensing electrodes to detect response of said oscillating symmetric leaf structure to physical phenomena exterior to said micromachined resonator.

22. The method of claim 19 where said step of oscillating said symmetric leaf structure oscillates said symmetric leaf structure in one or more plurality of modes about a plurality of said springs supporting said symmetric leaf structure with respect to said rim/base structure.

23. The method of claim 22 where said step of oscillating said symmetric leaf structure oscillates said symmetric leaf structure about said plurality of springs, which are symmetrically disposed with respect to said symmetric leaf structure.

24. The method of claim 23 where said step of oscillating said symmetric leaf structure about said plurality of symmetric springs oscillates said symmetric leaf structure in at least two separate modes.

25. The method of claim 24 where said step of oscillating said symmetric leaf structure about said plurality of symmetric springs oscillates said symmetric leaf structure about at least two separate axes.

26. The method of claim 19 further comprising the step of oscillating a mass element rigidly connected to said symmetric leaf structure.

27. The method of claim 26 where said step of oscillating a mass element comprises the step of oscillating a mass element symmetrically disposed with respect to said symmetric leaf structure.

28. The method of claim 27 where said step of oscillating a mass element comprises the step of oscillating a cylinder disposed through a center of mass of said symmetric leaf structure and extending at least in part perpendicular to said symmetric leaf structure.

29. A sensor comprising:

a symmetric leaf structure having a plurality of symmetrically disposed leaves about a defined center;

at least one spring symmetrically disposed with respect to said symmetric leaf structure and supporting said symmetrical leaf structure;

a rim/base structure to which said spring is coupled, said rim/base structure including a plurality of sensing electrodes; and     a circuit electrically coupled to said electrodes included within said rim/base structure, said circuit for receiving a sensing signal from said sensing electrodes to detect response of said symmetric leaf structure to physical phenomena exterior to said sensor,     whereby a rugged, small, low cost, high performance sensor is provided.

30. The sensor of claim 29 wherein said symmetric leaf structure is a clover leaf pattern comprised of four leaves symmetrically disposed about said center and wherein said clover leaf pattern is disposed within a plane.

31. The resonator of claim 30 further comprising four springs connected to said clover leaf pattern and symmetrically disposed between each of said four clover leaves to connect said center with said rim/base and to support said clover leaf pattern relative to said rim/base structure.

32. The resonator of claim 31 wherein said rim/base structure comprises a rim disposed in said plane of said clover leaf pattern and a base disposed beneath said rim and coupled to said rim.

33. The resonator of claim 32 wherein said electrodes provided within said rim/base structure are provided on said base, said electrodes being provided as said sensing electrodes, said sensing electrodes positioned on said base opposite corresponding ones of said leaves in said clover leaf pattern, each of said sensing electrodes being positioned opposite a different one of said leaves.

34. The resonator of claim 32 wherein said rim is symmetric with said clover leaf pattern and said springs.

* * * * *